United States Patent
Tammela et al.

(10) Patent No.: US 6,456,407 B1
(45) Date of Patent: Sep. 24, 2002

(54) OPTICAL TELECOMMUNICATIONS NETWORKS

(75) Inventors: Simo Tammela, Espoo (FI); Jaakko Aarnio, Espoo (FI)

(73) Assignee: Nokia Networks Oy, Espoo (FI)

( * ) Notice: Subject to any disclaimer, the term of this patent is extended or adjusted under 35 U.S.C. 154(b) by 57 days.

(21) Appl. No.: 09/627,203

(22) Filed: Jul. 27, 2000

Related U.S. Application Data (63) Continuation of application No. PCT/FI99/00114, filed on Feb. 12, 1999.

(30) Foreign Application Priority Data

Feb. 13, 1998 (FI) .................................................. 980328

(51) Int. Cl.$^7$ ..................... H04B 10/00; H04B 10/12; H04B 10/20
(52) U.S. Cl. ..................... 359/119; 359/110; 370/222; 370/223
(58) Field of Search ............................ 359/110, 119, 359/129–140; 370/222–224

(56) References Cited

U.S. PATENT DOCUMENTS

| | | | |
|---|---|---|---|
| 4,434,463 A | * 2/1984 | Quinquis et al. | 340/825 |
| 4,704,713 A | * 11/1987 | Haller et al. | 359/119 |
| 5,087,911 A | * 2/1992 | Green et al. | 340/825.01 |
| 5,548,431 A | 8/1996 | Shin et al. | |
| 5,717,795 A | 2/1998 | Sharma et al. | |
| 5,745,269 A | 4/1998 | Chawki et al. | |
| 5,923,643 A | * 7/1999 | Higgins et al. | 370/218 |
| 5,943,148 A | * 8/1999 | Hamel et al. | 359/110 |
| 6,023,359 A | * 2/2000 | Asahi | 359/110 |
| 6,049,405 A | * 4/2000 | Oberg | 359/110 |

FOREIGN PATENT DOCUMENTS

| | | |
|---|---|---|
| DE | 4337089 | 5/1995 |
| EP | 0677935 | 10/1995 |
| EP | 0677936 | 10/1995 |
| EP | 0765051 | 3/1997 |
| EP | 0876018 | 11/1998 |
| WO | WO 96/32787 | 10/1996 |
| WO | WO 98/04058 | 1/1998 |

OTHER PUBLICATIONS

Steven H. Hersey and Mark J. Soulliere, "Architectures And Applications Of Sonet In A Self–Healing Network", IEEE International Conference on Communications, Denver, Colorado, Jun. 23–26, 1991, vol. 3.

* cited by examiner

Primary Examiner—Leslie Pascal
Assistant Examiner—Agustin Bello
(74) Attorney, Agent, or Firm—Altera Law Group, LLC (57) ABSTRACT

The invention relates to an optical telecommunications network comprising several nodes (N1 . . . N8) interconnected by optical transmission paths that form several working rings (R1 . . . R5), each of which passes via every node (N1 . . . N8). Information is transmitted in the network at several different wavelengths. To ensure that the network can be implemented as cost-effectively as possible, it comprises N nodes (N1 . . . N8), N/2 working rings (R1 . . . R4), and N wavelengths ($I_1$ to $I_4$) in such a way that each node in the group of nodes is configured to receive signals at all the wavelengths in the group of wavelengths from only one of the rings in the group of rings as well as to transmit to at least all those rings in the group of rings from which the said node does not receive.

11 Claims, 9 Drawing Sheets

OPTICAL TELECOMMUNICATIONS NETWORKS

This application is a continuation of PCT/FI99/00114 filed Feb. 12, 1999.

FIELD OF THE INVENTION

The invention relates to optical telecommunications in general, and in particular to an optical telecommunications network that uses Wavelength Division Multiplexing (WDM).

BACKGROUND OF THE INVENTION

Figure 1A:
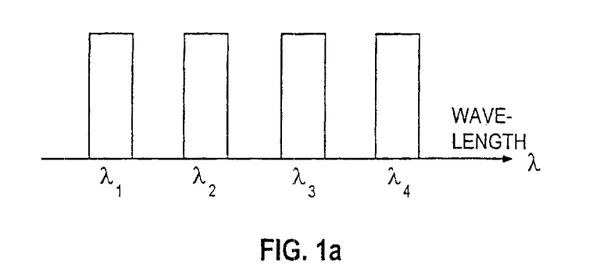
FIGS. 1a and 1b illustrate an optical transmission system that makes use of wavelength division multiplexing.
Figure 1B:
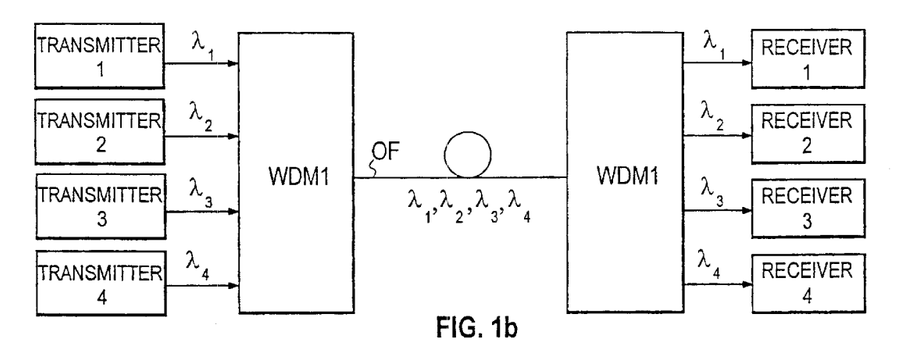

Wavelength division multiplexing (WDM) is an efficient way of multiplying the capacity of optical fibre. In wavelength division multiplexing, several independent transmitter-receiver pairs use the same fibre. FIGS. 1a and 1b illustrate the principle of wavelength division multiplexing, using as an example a system having four parallel transmitter-receiver pairs. Each of the four information sources (not shown in the figure) modulates one of four optical transmitters, each of which generates light at a different wavelength ($\lambda_1 \ldots \lambda_4$). As will be seen from FIG. 1a, the modulation bandwidth of each source is smaller than the distance between the wavelengths, and thus the spectra of the modulated signals do not overlap. The signals generated by the transmitters are combined onto the same optical fibre OF in a WDM multiplexer WDM1, which is a fully optical (and often passive) component. At the opposite end of the fibre, a WDM demultiplexer WDM2, which is also a fully optical (and often passive) component, separates the different spectral components of the combined signal from one another. Each of these signals is detected at a discrete receiver. Hence, a narrow wavelength window is assigned for the use of each signal in a given wavelength range. A typical practical example might be a system where the signals are in the 1550 nm wavelength range for example in such a way that the first signal is at the wavelength 1544 nm, the second signal at the wavelength 1548 nm, the third signal at the wavelength 1552 nm and the fourth signal at the wavelength 1556 nm. Nowadays a multiple of 100 GHz (approx. 0.8 nm) is becoming the de facto standard for the distance between wavelengths.

In order to enable a given wavelength channel to be branched off a transmission link using wavelength division multiplexing or a given wavelength channel to be added thereinto, an element called an add/drop filter has been developed. The task of an optical add/drop filter is (1) to direct off a selected narrow-band channel (wavelength) from the optical aggregate signal that passes in the fibre incoming to the filter (drop function) and/or (2) to add to the fibre outgoing from the filter a narrow-band channel (add function). The signals (wavelengths) that have not been selected for dropping pass through the add/drop element from the incoming fibre to the outgoing fibre. Thus a desired narrow-band channel is added or dropped in the filter without otherwise affecting the spectrum of the optical aggregate signal in any way.

FIG. 2 illustrates the structure of a known three-port add/drop filter OADE. References L1 ... L3 denote port-specific lenses and reference F an interference filter. The incoming fibre is connected to port A, through which a number of wavelength channels ($\lambda_1 \ldots \lambda_4$) arrive. One of the wavelength channels (in this example $\lambda_1$) passes through the interference filter F (and lenses L1 and L2) to port B. The remaining wavelength channels also pass through lens L1 but are reflected from the interference filter (through lens L3) to port C. The wavelength of the channel entering port B is a fixed, filter-specific constant.

The filter operates in both directions, and hence the adding function is achieved in such a way that the existing channels are fed to port C and a channel to be added to port B, and hence all channels are obtained from port A.

A three-port filter of the kind described above is manufactured for example by Optical Corporation of America, U.S.A.

The existing optical telecommunications systems based on wavelength division multiplexing have mostly been point-to-point systems used on high-capacity long-distance connections (trunk lines). However, optical transmission technology is being continually developed to be able to implement the lowest layers of broadband network architectures as fully optical systems, which would make it possible to handle the transmission of high-capacity information flows by purely optical means (i.e. using optical cross-connection and routing).

After the point-to-point systems, optical networks allowing add/drop functions, such as ring networks, will be the next step in this development. To make it possible to configure this type of network flexibly in response to traffic loads, add/drop filters have been graded to network elements allowing free selection of the wavelengths to be dropped and/or added. This type of add/drop device is, thus, a network element that can be configured to allow free selection of the wavelengths to be dropped/added.

Figure 3:
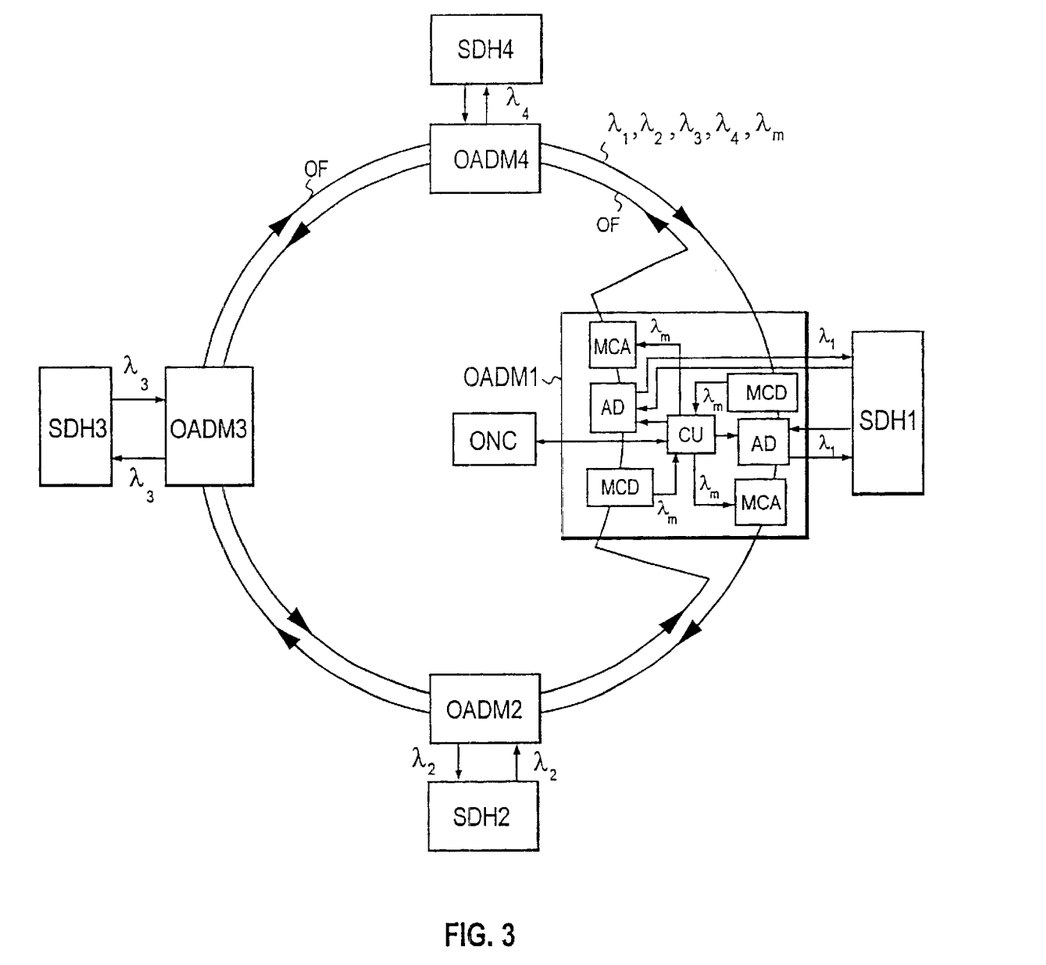
FIG. 3 illustrates a known optical ring network.

The following section will provide a brief description of a typical ring network with reference to FIG. 3. In the example shown in FIG. 3, the network is used for transmitting SDH (Synchronous Digital Hierarchy) signals, but the type of signal carried by each wavelength can, naturally, vary. The signal can also be a PDH (Plesiochronous Digital Hierarchy) signal or an ATM (Asynchronous Transfer Mode) signal, for example.

In this example, the ring network features four nodes consisting of the add/drop devices OADM1 to OADM4. For both directions of transmission, there is a dedicated ring. Between the nodes, there is an optical transmission connection consisting of optical fibres OF, and wavelength division multiplexing, as described above, is used on each one-way connection between two nodes. In the example, four wavelengths ($\lambda_1 \ldots \lambda_4$) and one management wavelength ($\lambda_m$) are used, but it is understood that the number of wavelengths used in the network may vary and be even higher. Each add/drop device may have an interface to the control system ONC of the device and/or of the entire optical network, which allows all the add/drop devices in the network to be configured as desired.

The management system is otherwise in the SDH equipment except that the add/drop multiplexers can be configured through the management system of the optical network. The optical signal from the SDH device is connected to the ring network at the selected wavelength. A desired number of wavelengths is defined for node-to-node connections in accordance with the traffic needs. In other words, the routing configurations corresponding to the various wavelengths can be changed in response to traffic load. Using the management signal carried by the management wavelengths, it is possible to configure each individual node to drop/add the desired wavelengths. As shown in the figure at node OADM1, there may be a dedicated drop element MCD for node management wavelength in both directions to drop the control channel at the management wavelength $\lambda_m$ to the node control unit CU, which, then, converts the signal into an electric signal and controls the add/drop part AD of the node as indicated by the management signal to drop the desired channels into the SDH equipment and to add the desired wavelengths from the SDH equipment. In addition to the drop element, there is an add element MCA for both transmission directions to add the management channel from the control unit CU to the signal being transmitted by the node.

Node management can also be effected directly by means of a local control interface (optical or electric) to control each node individually through the local interface; node management can also be effected using both a local control interface and the network management channel, so that a signal can be connected to the network management channel via the local control interface.

Each wavelength can, for example, be used to carry an STM-N (Synchronous Transport Module) signal, such as STM-16 (N=16). In the example of FIG. 3, it has been simply presumed that wavelength $\lambda_1$ corresponds to SDH device SDH1, wavelength $\lambda_2$ corresponds to SDH device SDH2, wavelength $\lambda_3$ corresponds to SDH device SDH3 and wavelength $\lambda_4$ corresponds to SDH device SDH4.

One important consideration besides the cost-effectiveness of the network is its reliability in operation. To ensure this, ring networks usually feature a protection system with optical switches to make it possible to create the required connection via the remaining ring in the event that a connection between two nodes fails.

With the increased use of ring networks, optical telecommunications networks will increasingly be implemented as networks covering a more limited geographical area. In the next phase, the networks will typically be regional networks with a diameter 10 to 100 km. Since the number of nodes and different interfaces in such networks will increase dramatically, it is of growing importance that the basic network architecture ensures maximum cost-effectiveness. Because the WDM technology is still expensive for the user, it is vital that the network offers as versatile data transmission capabilities as possible right from the beginning as well as scalability in anticipation of future transmission needs.

Another important point in the interest of cost-effectiveness is that all the network components can be implemented at as low a cost as possible. As far as optical receivers are concerned, they are capable of receiving several wavelengths. However, transmitters, for example, usually operate only at one wavelength. Transmitters operating at multiple wavelengths have been developed, but they are clearly more complicated to manufacture and control than single-wavelength transmitters. Therefore, it would be useful if networks where a connection can be established between any two nodes (such as in a total mesh network), would, at least initially, be able to manage with one single-wavelength transmitter at each node (excluding the spare transmitter).

SUMMARY OF THE INVENTION

The purpose of the invention is to provide an optical telecommunications network that will help to achieve the objectives described above as effectively as possible.

This is accomplished by the solution defined in the independent patent claims.

From the point of view of network architecture and functionality, there are two parameters that can be used to influence the cost-effectiveness of the basic architecture: the (number of) wavelengths used, and the fibres to which each wavelength is fed. The invention is based on the fact that usually when installations are made, a number of extra optical fibres are laid in anticipation of future needs. Since the existing installations already incorporate such "dark" or single-wavelength fibres, they can be utilised at the expense of the wavelengths used.

The idea is to use N nodes, N/2 working rings and N/2 wavelengths as an operational network or sub-network in such a way that each node is configured to receive at all wavelengths from only one of the rings in the group of rings and to transmit at a single wavelength at least to all those rings in the group of rings from which it does not receive. The network topology arrived at in this process consists of a combination of a ladder and ring structure (a ladder bent to the shape of a ring with the nodes constituting the rungs). A working ring is a ring that is used in normal operation (when there are no faults in the network). In addition to the working rings the network usually features protection rings to be used in case of a network failure.

Using a solution in accordance with the invention, it is possible to use no more than one single-wavelength transmitter at each node to enable the node to set up a connection with any other node in the network. A single transmission frequency offers the additional advantage that if the node includes several transmitters, one of them can serve as a spare transmitter for all the other transmitters.

The basic structure of the network also allows-flexible extension. In other words, new connections and nodes can be added to the network with great flexibility.

To upscale, reconfigure and combine networks, known methods suitable for physical ring topologies can be used.

LIST OF DRAWINGS

The inventions and its preferred embodiments are described in more detail with reference to FIGS. 4 to 9 using the examples illustrated in the attached drawings, in which

FIG. 2 shows a known add/drop filter that can be used to add/drop a single wavelength;

DETAILED DESCRIPTION OF THE INVENTION

Figure 4:
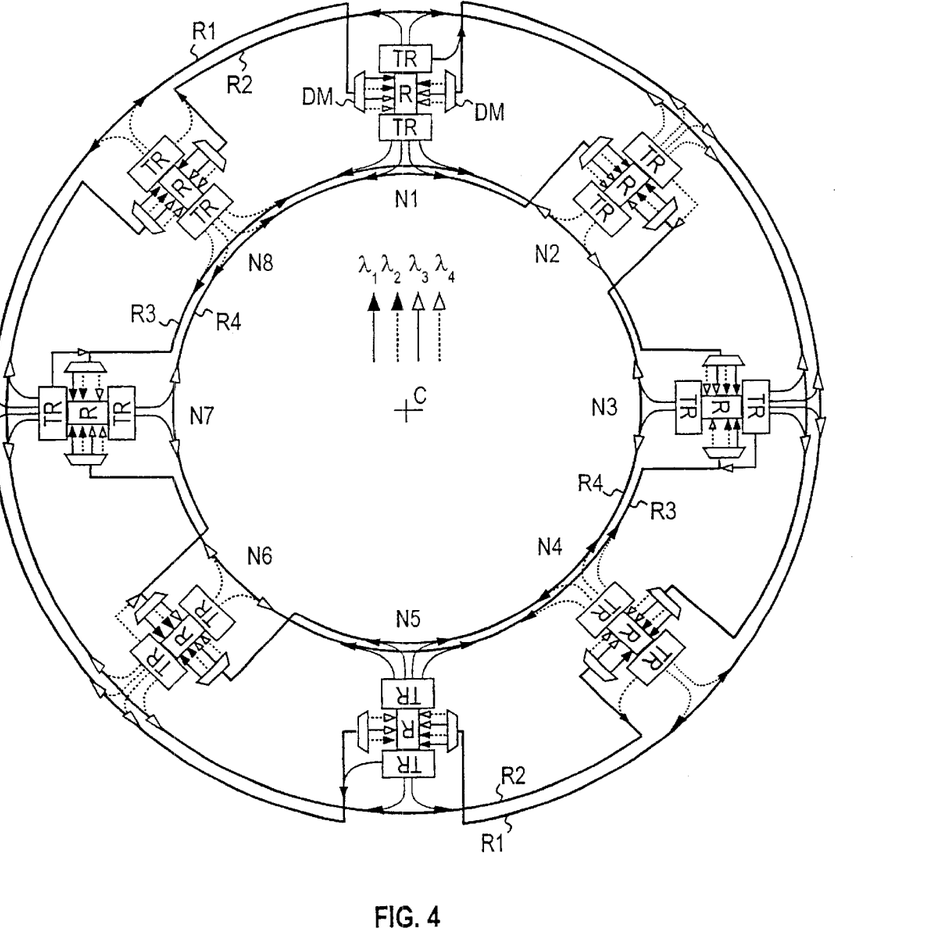
FIG. 4 shows the basic network architecture according to the invention.

In FIG. 4, the optical network in accordance with the invention is shown in its basic set-up, i.e. in a set-up where only one wavelength channel exists between any two nodes. However, the network is complete in the sense that any one node is capable of communicating with any other node in the network.

The network shown as an example in FIG. 4 features a total of eight nodes N1 . . . N8, numbered clockwise starting from the topmost node in the figure. The nodes are interconnected by a total of four fibre rings R1 to R4 (numbering starting from the outermost ring towards the innermost). In fact, each fibre ring consists of two fibres, each constituting one half of the ring.

The network operates at four wavelengths $\lambda_1$ to $\lambda_4$, represented in the figure by different arrows such that wavelength $\lambda_1$ is represented by an arrow consisting of a solid line and a black head, wavelength $\lambda_2$ by an arrow consisting of a broken line and a black head, wavelength $\lambda_3$ by an arrow consisting of a solid line and a white head, wavelength $\lambda_4$ by an arrow consisting of a broken line and a white head. Each node transmits at only one of the wavelengths, while two nodes transmit at a specific wavelength. However, each node receives at all four wavelengths to ensure that each node can receive transmissions for any node in the network.

For each node, the figure shows the receiver R and transmitter TR which, for the sake of clarity, is depicted as split into two on both sides of the receiver R. In addition, the figure shows, for each node, the demultiplexer DM (reference mark only for node N1), which separates (using a known technique) the wavelengths coming in from the incoming fibre and directs them to their respective reception fibres connected to the node receiver R. The different arrows at each demultiplexer output indicate the wavelengths arriving at the node from each fibre.

As the figure shows, each node receives signals from a specific (single) ring, while a total of two nodes receive from the same ring; nodes N1 and N5 receive signals from ring R1, nodes N4 and N8 from ring R2, nodes N3 and N7 from ring R3, and nodes N2 and N6 from ring R4. Each node transmits signals at its specific wavelength to all rings. The nodes transmit only in one direction in rings from which they receive, but in both directions in all other rings. In the figure, the different arrows drawn from transmitter TR illustrate the transmission wavelength and the directions of transmission used by each node.

The logical structure of the network is symmetrical relative to the assumed centre point C. In other words, each node has, on the opposite side of the centre point C, a counterpart or mirror-image node that transmits to the same rings at the same wavelength as the mirror-image node and receives from the same ring as the mirror-image node. In the ring from which the mirror-image nodes receive they transmit in opposite directions.

FIG. 4 shows the routes via which each node is capable of communicating with the other nodes. When a node wishes to communicate with another node, it transmits in the selected direction of transmission to the ring from which the other node receives. For example, if node N1 wishes to communicate with node N2, it transmits to ring R4 in the direction of node N2. Based on the direction from which the signal is received, node N2 knows that the signal being received at wavelength $\lambda_1$ comes from node N1 (and not from its mirror-image node N5). When node N2, in turn, wishes to transmit to node N1, it transmits at its specific wavelength to ring R1 in the direction of node N1. If node N1 transmits in the opposite direction (counter-clockwise) to ring R4, the signal is received by node N6 whose location in the network is symmetrical to that of node N2 and which is, thus, the "mirror-image" node of node N2.

Figure 5:
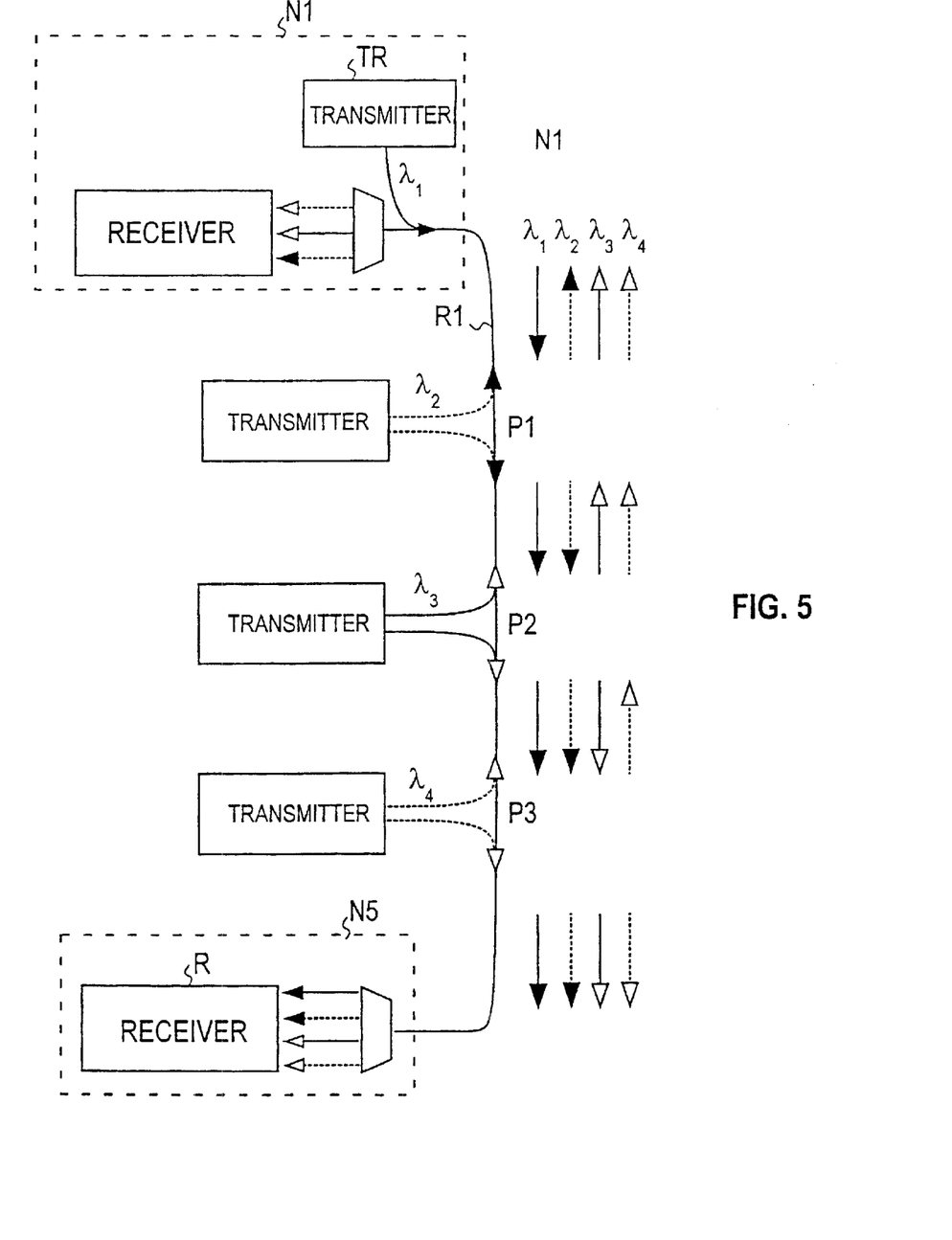
FIG. 5 illustrates the appearance and direction of travel of various wavelengths in the network shown in FIG. 4.

FIG. 5 illustrates the appearance and direction of travel of various wavelengths in one half of the outer ring (R1) shown in FIG. 4. Along the entire length of the fibre, the situation is that of the several signals passing a single given point, some travel in the opposite direction to the others. Despite this, the fibre contains no point where the signal of a single wavelength would travel in two opposite directions (reflections are eliminated). In other words, point P1 lacks the wavelength $\lambda_2$, point P2 lacks the wavelength $\lambda_3$ and point P3 the wavelength $\lambda_4$.

In the network shown in FIG. 4, the node and its counterpart nodes (nodes Ni and N(i+4) where i=1, 2 3 or 4) share the ring from which they receive half and half, so that the first node uses the first half to transmit to the second node and the second node uses the second half to transmit to the first node.

As a result, the counterpart nodes communicate with each other using physically different cables. In some cases, the distance between counterpart nodes may, in real-life networks, differ greatly according to the direction of travel. This potential drawback can be overcome by introducing to the network an additional ring to carry transmissions from some of the nodes.

Figure 6:
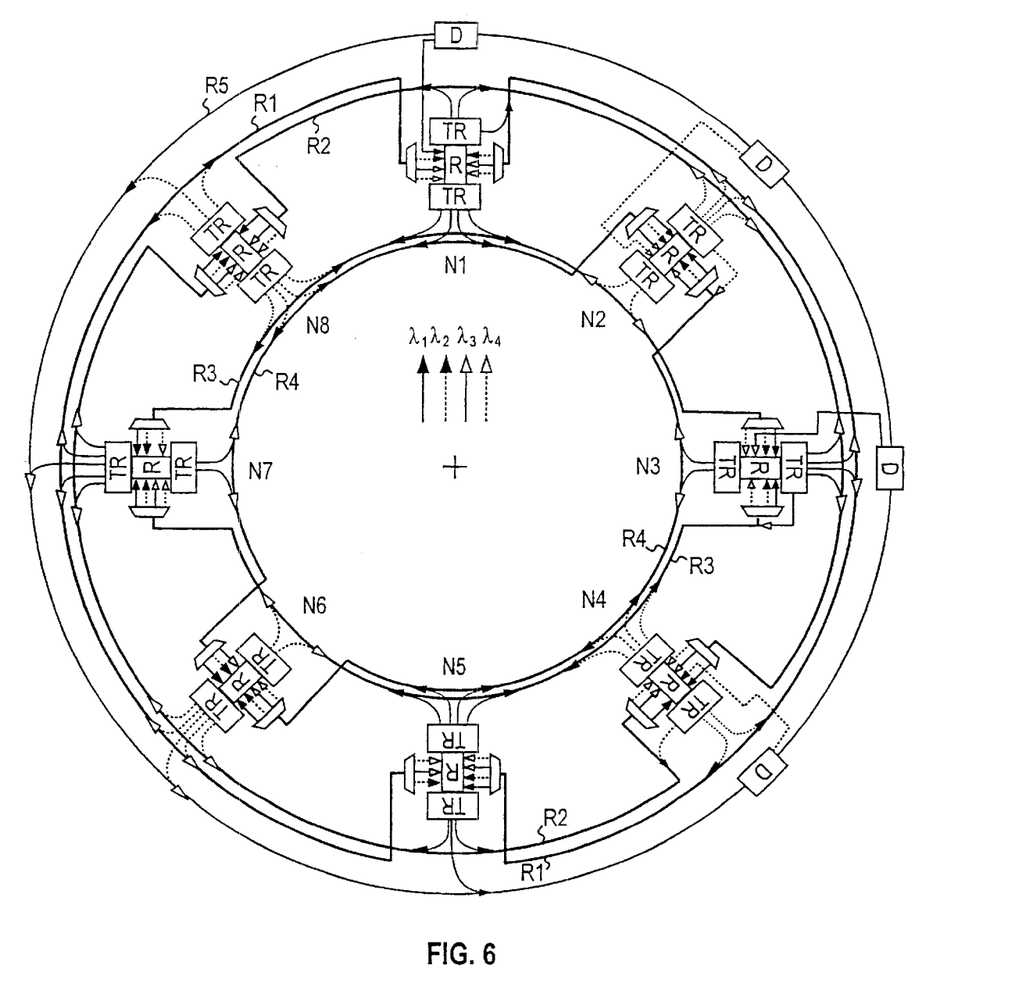
FIG. 6 illustrates one preferred embodiment of the network in accordance with the invention.

This embodiment is illustrated in FIG. 6, where such a ring (the fifth ring) R5 is installed as the outermost ring in the network. From this ring, signals are dropped to nodes N1 to N4 using the add/drop unit D associated with each node (drop function only). Nodes N5 to N8 transmit to this ring so that node Ni transmits in the direction of node N(i−1) (counter-clockwise in the figure), and the wavelength channel sent by the node is dropped to its counterpart node.

When protection is to be provided for this type of network, the easiest way of doing so is to add a dedicated protection ring to each individual ring.

Figure 7A:
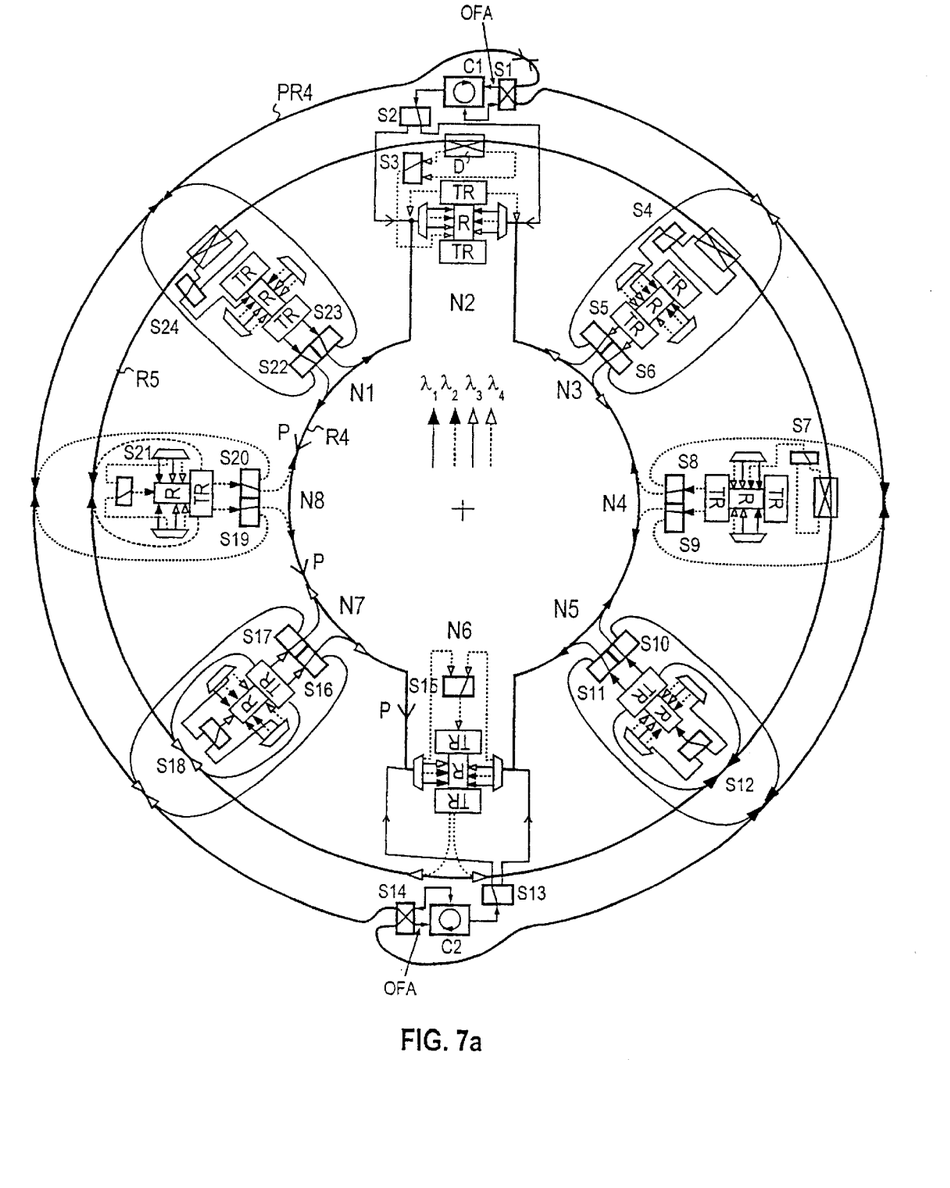
FIG. 7a illustrates another preferred embodiment of the network in accordance with the invention.

FIG. 7a illustrates protection in the network shown in FIG. 6. For the sake of simplicity, FIG. 7a only shows ring R5 and ring R4 and its protection ring PR4, which runs along the outer edge of the network. In FIG. 7a, the network is rotated relative to FIG. 6, so that node N2, which receives from the protection ring R4, is shown at the top.

Figure 8A:
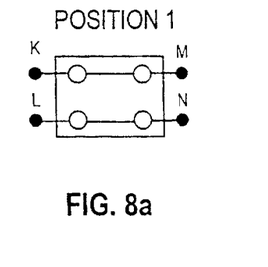
FIGS. 8a and 8b illustrate the two positions of the switches used for protection.
Figure 8B:
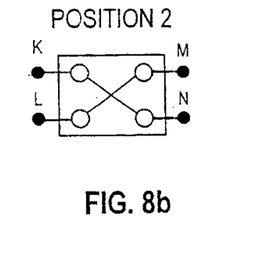

The protection ring consists of two halves inter-connected at the nodes that receive from the protection ring (R4) (i.e. node N2 and its counterpart node N6). For this purpose, optical circulators C1 (node N2) and C2 (node N6) are provided at these nodes. At both nodes, the ends of the protection ring halves are connected to the input terminals of the optical 2×2 switch (S1 and S14). The output terminals of the switches are, in turn, connected to the first and second port of the circulator. The third port of the circulator is connected via the switch (S2 or S13) to the receiving multiplexer. The circulator operates in the same way as a conventional non-optical circulator, i.e. power fed into any of the ports exits from the next port. Switches S1 and S14 have a through-connection position as shown in FIG. 8a, where the switch connects the input terminal K to the output terminal M and the input terminal L to the output terminal N, and a cross-connection position as shown in FIG. 8b, where the switch connects the input terminal K to the output terminal N and the input terminal L to the output terminal M. The rest of the switches are of a type that allows selection of either input for connection to the output.

The nodes (N2 and N6) receiving from ring R4 can transmit to their counterpart nodes in either direction, while transmission from every other node to the ring takes place through the switches so that transmission to protection ring PR4 can be switched to either direction. In FIG. 7a, this feature is evident in that at node N3 transmission takes place via switches S5 and S6, at node N4 via switches S8 and S9, at node N5 via switches S10 and S11, etc., and at node N1 via switches S22 and S23. Moreover, all the nodes (N5 to N8) transmitting to ring R5 can transmit in either direction in the ring. Each node also offers the possibility of selecting which wavelength channels are received from which direction. These routing configurations are explained in more detail below with reference to two different failure modes.

Figure 7B:
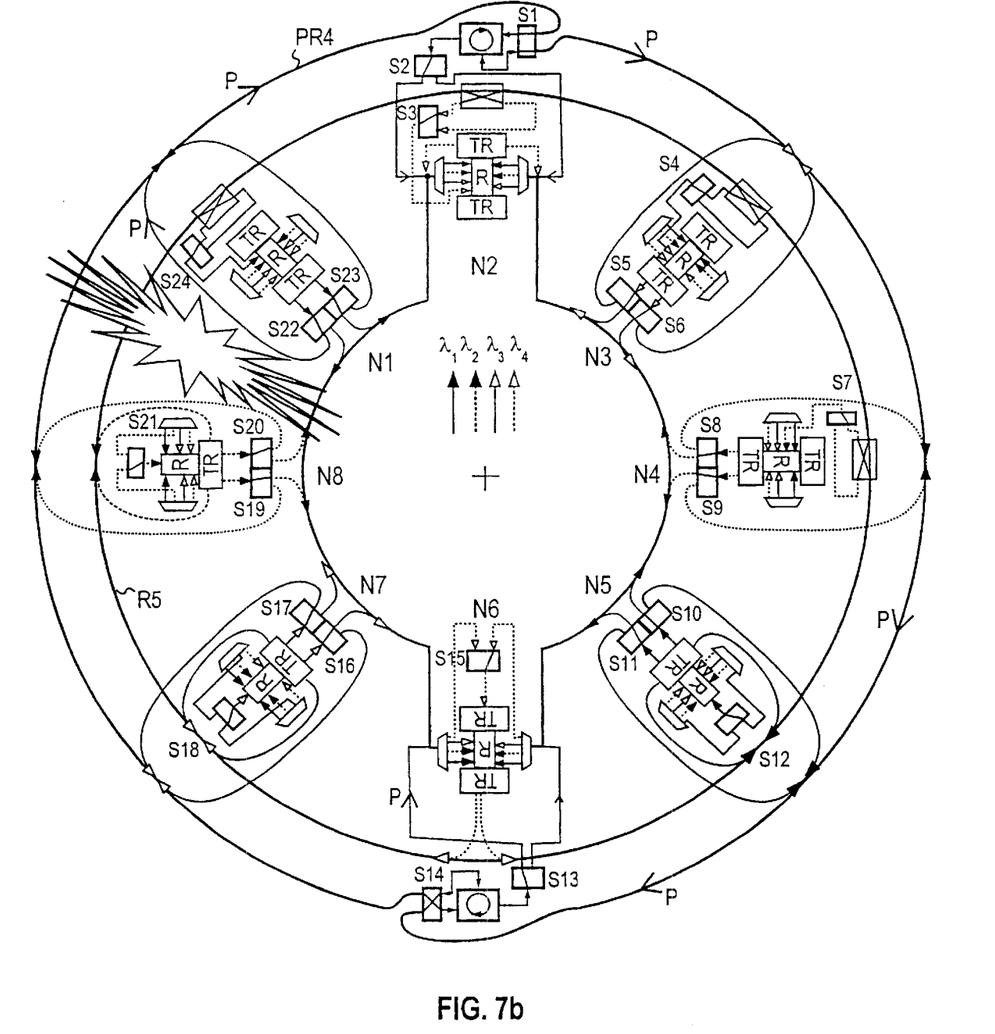
FIG. 7b shows the network of FIG. 7a in one failure mode.
Figure 7C:
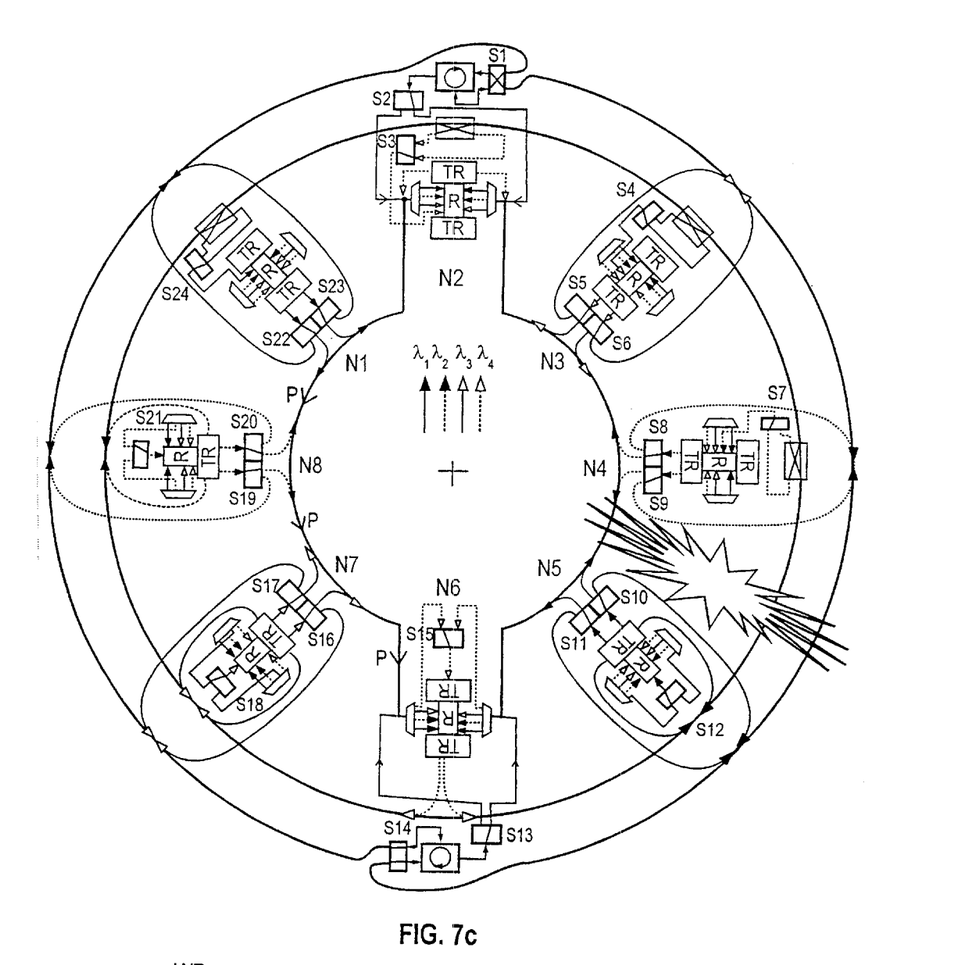
FIG. 7c shows the network of FIG. 7a in another failure mode.

FIG. 7a shows the network in normal operation where all the connections operate normally, while FIG. 7b depicts a situation where there is a break in the left-hand part of the network, and FIG. 7c a situation where there is break in the right-hand part of the network. To illustrate the routes between the nodes, the positions of all switches are shown in the figures.

In normal operation as shown in FIG. 7a, all the nodes transmit and receive in the same way as in FIG. 6. In other words, node N6 transmits to node N2 in a counter-clockwise direction via the right half of ring R5 (with node N2 receiving the signal through switch S3), node N2 transmits to node N6 in a clockwise direction via the right half of ring R4 (with node N6 receiving the signal via switch S15), while all other nodes transmit to ring R4 in both directions.

in the situation shown in FIG. 7b, there is a break in the network between nodes N1 and N8. For the purposes of this example, it is assumed that all the fibres between the two nodes are broken. In the event of such a failure, nodes N7 and N8 switch their transmissions in ring R4 destined towards the break to protection ring PR4 towards node N6 by repositioning the switches S17 and S20 as shown in FIG. 7b. This signal passes via switch S14, circulator C2 and switch S14 to the other half of the protection ring and further on via switch S1, circulator C2 and switch S2 to the receiver at node N2. Similarly, node N1, by changing the position of switch S22, turns the transmission destined for ring R4 towards the break (to node N6) to protection ring PR4 towards node N2. This signal passes via switch S1, circulator C1 and switch S1 to the other half of the protection ring and further on via switch S14, circulator C2 and switch S6 to the receiver at node N6. As a result, all the nodes are capable of communicating with one another despite the break.

In the situation shown in FIG. 7c, there is a break in the network between nodes N4 and N5. Contrary to normal operation as shown in FIG. 7a, nodes N3 and N4 switch their transmissions to ring R4 towards the break destined for node N6 to protection ring PR4 towards node N2. This is achieved by changing the positions of switches S6 and S9. These signals pass via switch S1, circulator C1 and switch S1 to the other half of the protection ring and further on via switch S14, circulator C2 and switch S13 to the receiver at node N6. In addition, the said nodes, as well as nodes N1 and N2 (i.e. all nodes receiving from ring R5) change the direction from which they receive from ring R5 because nodes N5 to N8 also reverse their transmission direction in respect of this ring (clockwise in the figure), as opposed to the normal operation illustrated in FIGS. 6 and 7a. Furthermore, nodes N5 to N8 change the direction of transmission for their own transmission wavelength (by changing the positions of switches S12, S15, S18, and S21) because transmission from the counterpart node needs to take place in such a way that the break does not remain in between the transmitting and receiving node.

FIGS. 7a to 7c also show, by way of an example, the route of the wavelength channel through the network from node N1 to node N6 when the network operates normally and when there is a malfunction. This route is illustrated by arrows denoted by the letter P.

All the other working rings in the network (in addition to ring R4) are protected in a similar fashion. Each protection ring features switches and circulators at those nodes that receive from the ring to be protected.

In a failure mode as described above, the network management system, which was briefly outlined in connection with FIG. 3 above, correctly reconfigures the routes for each node depending on where in the network the fault exists. Configuration can also be effected in a distributed mode at individual nodes without a centralised management system. Because the response to failures takes place using a known method and because it is not directly related to the concept of the invention, no detailed description is provided here. To ensure correct operation, the management system must, however, receive information of a failure, or the node must be capable of detecting failures in the node itself or in its surroundings and respond to them appropriately.

Although network protection is described with reference to the type of network shown in FIG. 6, where potential differences in delay are eliminated by using an additional ring (R5), protection can be provided, in a similar fashion, for the basic type of network shown in FIG. 4. The network is constructed in the same way, except that ring R5 and the related elements are omitted. Then, counterpart nodes use the same ring for mutual communications, as indicated in connection with FIG. 4.

Figure 9:
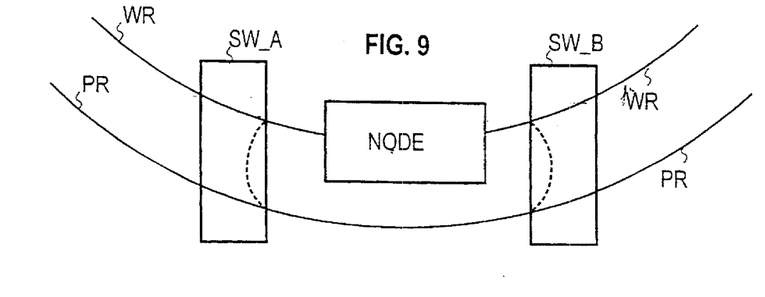
FIG. 9 illustrates a known method of providing protection for a network in accordance with the invention.

Although the method of protection described above is related to the invention, it should be noted that protection for the basic network (FIG. 4) can be provided using a known conventional method of protection, illustrated in FIG. 9 for a single node with one working ring WR and its protection ring PR. On both sides of each node, there are switches (SW_A and SW_B) that can be used to change the route of the signal. In normal operation with no faults in the network, the switches link the ends of the fibres as shown by solid lines drawn through the switches. In the case of a network failure, when, for example, the connection between two nodes is affected, the signal is switched from the working ring to the protection ring at the node located before the break in the working ring, and from the protection ring to the working ring at the node located after the break in the working ring. This ensures that the signal travels along the working ring in the forward direction and in the protection ring in the return direction. Potential switch positions in case of failure are indicated in the figures by dashed lines. A major benefit offered by the method of protection according to the invention, as compared with a known method of protection, is that the signal can always be made to take the shortest route available. In contrast, the advantage offered by the conventional method of protection is that the network is easier to manage because switch reversal data are only required at two points of the network.

For the sake of clarity, the example used in the foregoing shows a network with only one wavelength channel between two nodes. To increase network capacity, it is possible to have more than one wavelength channel or more fibres or fibre rings than shown in the examples. Essential to the invention is that the type of pool described above, consisting of N nodes, N/2 fibre rings (all of them being working rings), and N/2 wavelength channels, are used as described above. Thus, a network constructed from this pool, as shown in FIG. 4 or 6, for example, can serve as an independent network or as a sub-network for a larger network.

Also, the network in accordance with the invention is scalable on the optical layer by preserving the physical ring topology. Scalability means that the logical connections within the network are not broken when logical connections or nodes are added or removed. In addition, the network is, to a limited extent, scalable on the optical level into an arbitrarily connected physical and logical mesh topology. Moreover, the network is freely expandable by sharing network resources on the optical and electrical layer.

When the physical ring topology is retained, the traffic matrix of the network can be reorganised in such a way that a logical connection can be set up between any two nodes using an optical channel. (The traffic matrix indicates the logical connections between the nodes.) In an arbitrarily connected physical and logical mesh topology, the traffic matrix can only be reorganised to a limited extent. In sub-networks, the reorganisation can be carried out by providing a logical connection between any two nodes on an optical channel. In an arbitrarily connected physical and logical mesh topology, the traffic matrix can be freely reorganised (within the limits imposed by network resources) by sharing network resources on the optical and electric layers.

Figure 10A:
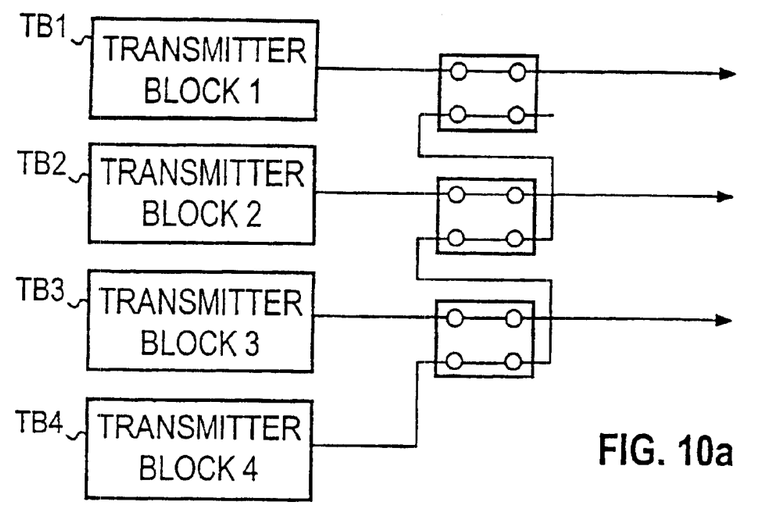
FIGS. 10a and 10b illustrate the use of a spare transmitter at a node.
Figure 10B:
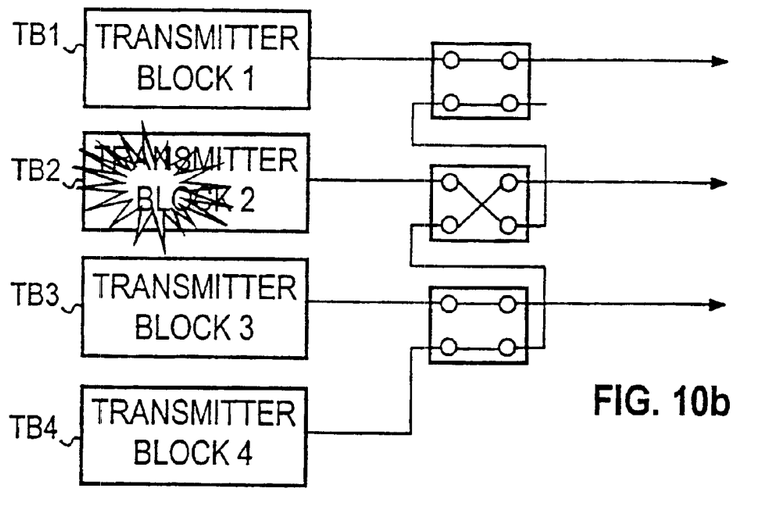

Another advantage offered by a solution in accordance with the invention is that if several transmitter components are used in the network, one transmitter component can serve as a common spare transmitter unit for all other transmitter units because they all transmit at the same wavelength. FIG. 10a illustrates a situation with three transmitter blocks TB1 to TB3 that are used in normal operation. The output of each operational transmitter block is connected to one of the two inputs of the corresponding optical 2×2 switch. In normal operation, all the switches are in the through-connection position as shown in FIG. 10a. The fourth transmitter block TB4 at the node is a common spare transmitter block whose output is connected through all the switches. If one of the transmitters fails, the corresponding switch is directed into the cross-connection position and the signal of the spare transmitter replaces that of the failed transmitter (and vice versa). FIG. 10b gives an example of a situation where transmitter block TB2 has failed.

Moreover, the nodes need not be physically removed from one another, but several nodes can be located at one point. The node or its components can be distributed across the network, which makes it possible to provide additional channels where needed. In essence, the description given above relates to the logical structure of the network because its physical configuration may vary.

Although the invention has been described above by means of examples with reference to the related drawings, it is obvious that the invention is not limited to the said embodiments but can be varied within the concept of the invention as presented in the attached patent claims. For example, various components, such as amplifiers, can be added to the network. If, for example, optical amplifiers are needed in the network, they should preferably be placed at the points denoted by OFA in FIG. 7a because then only those signals that are switched from one half of the protection ring to another are amplified.

What is claimed is:

1. An optical telecommunications network comprising several nodes (N1 to N4) interconnected by optical transmission paths that form several working rings (R1 to R5), each of which passes via every node, in which network information is transmitted at several different wavelengths, characterized in that the network comprises a group of nodes (N1 to N8) including N nodes, a group of working rings including N/2 working rings (R1 to R4), and a group of wavelengths including N/2 wavelengths ($\lambda_1$ to $\lambda_4$) in such a way that each node in the group of nodes is configured to receive signals at all the wavelengths in the group of wavelengths from only one of the rings in the group of rings, and to transmit at only one wavelength in the group of wavelengths at least to those rings in the group of rings from which that particular node does not receive signals.

2. A telecommunications network according to claim 1, characterized in that a node is configured to transmit at one of the wavelengths in the group of wavelengths to all the rings in the group of rings.

3. A telecommunications network according to claim 1, characterized in that each node is configured to receive from both directions in the said ring and to transmit in both directions to the other rings in the group of rings except for the ring from which the node involved is configured to receive.

4. A telecommunications network according to claim 3, characterized in that a specific wavelength in the group of wavelengths is allocated for transmission use to those nodes that are configured to receive from same ring in the group of rings.

5. A telecommunications network according to claim 1, characterized in that it includes an additional ring (R5) that links all the nodes in the said group of nodes and to which N/2 nodes in the group of nodes transmit and from which the remaining N/2 nodes receive, whereby those nodes that are configured to transmit to the additional ring, transmit at their specific wavelength to all those rings in the group of rings from which they do not receive, while those nodes that are configured to receive from the additional ring transmit to all the rings in the group of rings.

6. A telecommunications network according to claim 5, characterized in that a wavelength transmitted via the additional ring is received by the node that receives from the same ring as the node transmitting at the said wavelength.

7. A telecommunications network according to claim 1, characterized in that it also includes a protection ring specific to at least one of the rings in the said group of rings and that each protection ring comprises two halves interconnected at the nodes configured to receive from that particular ring in the group of rings whose protection ring is involved.

8. A telecommunications network according to claim 7, characterized in that the two halves of the protection ring are interconnected so that the ends of both halves are connected to the input terminals of an optical 2×2 switch, the outputs of the said switch being connected to the first and second port of a circulator, while the third port of the circulator is connected to the receiver at the node.

9. A telecommunications network according to claim 8, characterized in that the third port of the circulator is connected to the node receiver through a switch so that the switch can be used to select the direction from which the node receives signals coming in via the switch.

10. A telecommunications network according to claim 7, characterized in that it includes a protection ring specific to each ring in the said group of rings.

11. A telecommunications network according to claim 7, characterized in that every node transmitting to the ring to be protected transmits through a switch that can be used to switch the transmission from the working ring involved to the protection ring.

* * * * *